United States Patent
Pitt

(10) Patent No.: US 7,028,948 B2
(45) Date of Patent: Apr. 18, 2006

(54) APPARATUS FOR INCREASE OF AIRCRAFT LIFT AND MANEUVERABILITY

(75) Inventor: Dale M. Pitt, Affton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/653,013

(22) Filed: Aug. 28, 2003

(65) Prior Publication Data

US 2005/0045765 A1    Mar. 3, 2005

(51) Int. Cl.
B64C 3/44    (2006.01)

(52) U.S. Cl. .................................................. 244/46

(58) Field of Classification Search ............. 244/34 R, 244/35 R, 46, 219, 48, 47; D12/319
See application file for complete search history.

(56) References Cited

U.S. PATENT DOCUMENTS

| | | | | |
|---|---|---|---|---|
| 1,819,948 | A | * | 8/1931 | Diago ........................ 244/46 |
| 4,235,400 | A | * | 11/1980 | Haworth ..................... 244/218 |
| 4,890,803 | A | * | 1/1990 | Smith ........................ 244/219 |
| 5,078,339 | A | * | 1/1992 | Lapidot ....................... 244/49 |
| D345,396 | S | * | 3/1994 | Delaney .................... D21/451 |
| 5,312,070 | A | * | 5/1994 | Arena ......................... 244/46 |
| 5,671,898 | A | * | 9/1997 | Brown ........................ 244/46 |
| 5,899,410 | A | * | 5/1999 | Garrett ..................... 244/45 R |
| 5,984,231 | A | * | 11/1999 | Gerhardt et al. .............. 244/46 |
| 6,601,795 | B1 | * | 8/2003 | Chen ........................... 244/46 |

FOREIGN PATENT DOCUMENTS

| | | | |
|---|---|---|---|
| DE | 2725221 | * 12/1978 | |
| WO | WO8911417 | * 11/1989 | ................ 244/46 |

OTHER PUBLICATIONS http://www.fanwars.be/plan/pic/X-wing.jpg.*
Shawn E. Gano, John E. Renaud, Stephen M. Batill, Andres Tovar, Shape Optimization for Conforming Airfoils, 44th American Institute of Aeronautics and Astronautics AIAA/ASCE/AHS Structures, Structural Dynamics, and Materials Conference, Apr. 7-10, 2003, Norfolk, Virginia, AIAA 2003-1579, Department of Aerospace and Mechanical Engineering, University of Notre Dame, Notre Dame, Indiana.

* cited by examiner

*Primary Examiner*—Tien Dinh
(74) *Attorney, Agent, or Firm*—Black Lowe & Graham, PLLC

(57) ABSTRACT

A morphing airfoil system includes a first airfoil having a first root, first span, first chord, and first tip. The first airfoil is attachable to an aircraft near the first root. A second airfoil has a second root, second span, second chord, and second tip. The second airfoil is attachable to the aircraft near the first root. At least one moveable connection is attached to at least one of the first airfoil and the second airfoil near their respective roots. The moveable connection is arranged to permit movement of at least one of the first airfoil and the second airfoil from a first position with their tips near each other to a second position with their tips spaced apart from each other. An endplate may connect the two airfoils near their respective tips.

27 Claims, 5 Drawing Sheets

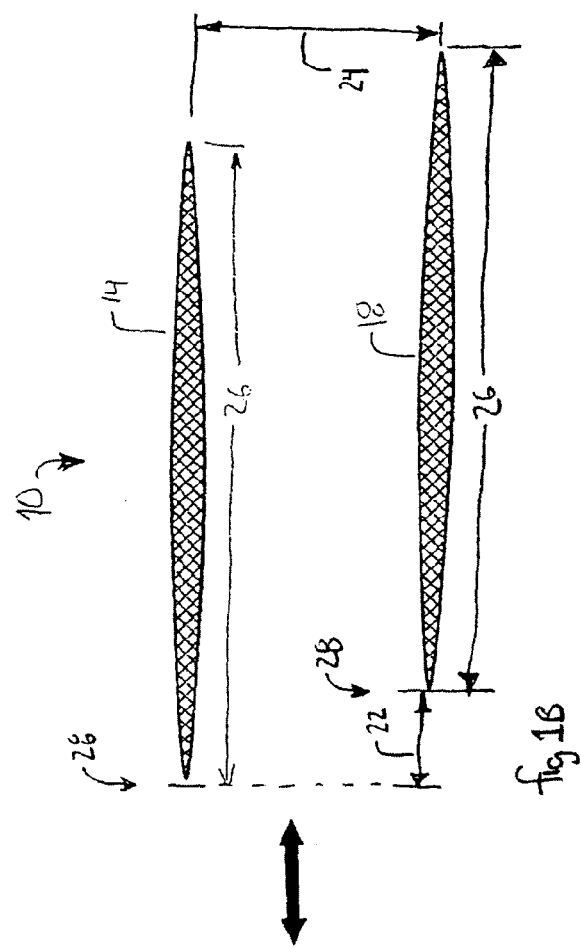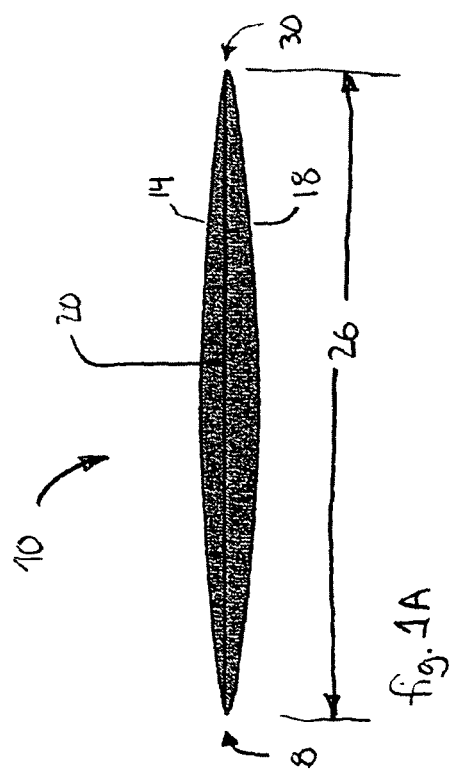

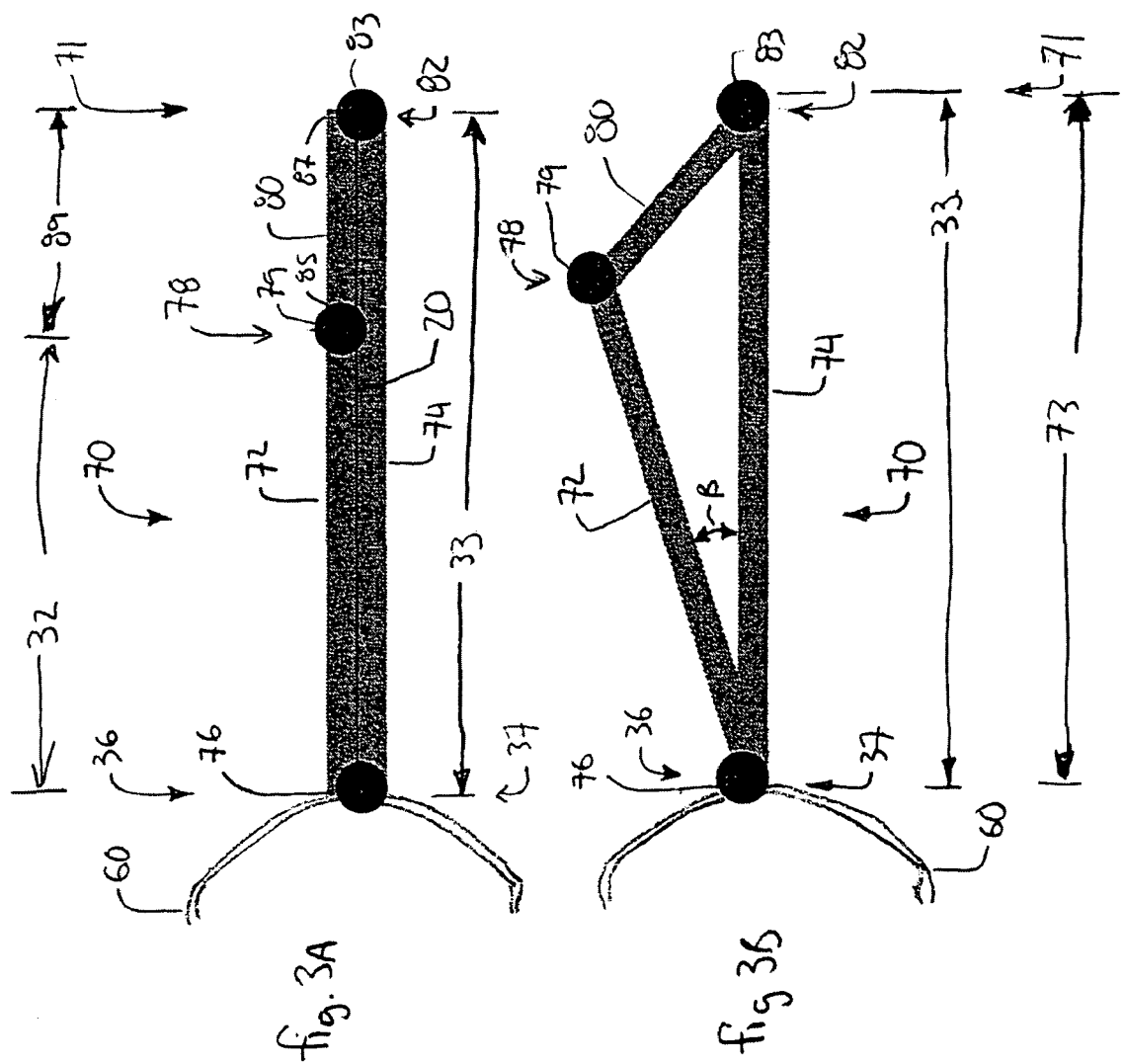

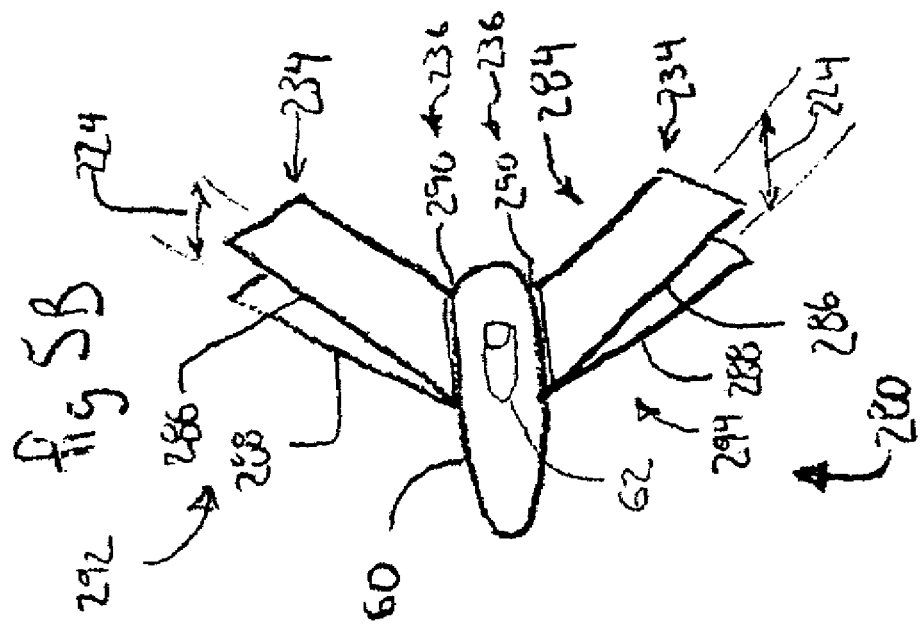
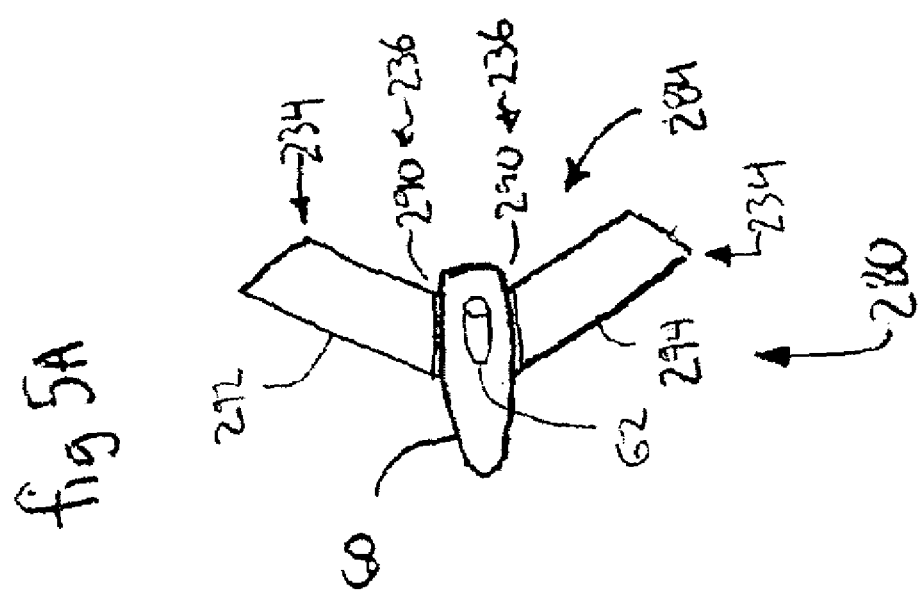

APPARATUS FOR INCREASE OF AIRCRAFT LIFT AND MANEUVERABILITY

FIELD OF THE INVENTION

This invention relates generally to aircraft wing configurations, and, more specifically, to variable aircraft wing configurations.

BACKGROUND OF THE INVENTION

Current aircraft utilize a variety of methods to increase lift and maneuverability at different speeds and orientation. Such methods include leading and trailing edge flaps, swinging/sweeping wings, and control surface deflections. These techniques provide increases in wing lift, but generally less than 30% of total lift. In aircraft with variable missions, including cruise, high maneuverability and loiter tasks, there is an unmet need, including for unmanned aircraft, for wing configurations that can provide further increases in lift and maneuverability.

SUMMARY OF THE INVENTION

The present invention presents a morphing airfoil system for an aircraft, thereby providing increased lift and maneuverability. The invention provides flexibility for increasing the lift of an aircraft, subsequently increasing its capability to maneuver. Increasing aircraft lift and maneuverability makes an aircraft more agile and increases its capability of surviving in a hostile environment. Increased aircraft performance also translates into increased aircraft payload capability and hence economic benefits for an aircraft owner.

An exemplary morphing airfoil system includes a first airfoil and a second airfoil. The first airfoil has a first root and a first tip, and the first airfoil is attachable to an aircraft near the first root. The second airfoil has a second root and a second tip, and the second airfoil is attachable to the aircraft with the second root near the first root. The system also includes at least one moveable connection attached to at least one of the first airfoil near the first root and the second airfoil near the second root. The moveable connection is arranged to permit movement of at least one of the airfoils from a first position with the first airfoil tip and the second airfoil tip near each other to a second position with the first airfoil tip and the second airfoil tip spaced apart from each other.

According to an aspect of the invention, the tips of the first airfoil and the second airfoil may move away from each other with a component perpendicular to their chords. In another aspect of the present invention the tips may move away from each other in a direction with a component parallel to their chords.

In a further aspect of the present invention, the morphing airfoil system includes an endplate attached to the first airfoil near the first airfoil tip, and attached to the second airfoil near the second airfoil tip.

BRIEF DESCRIPTION OF THE DRAWINGS

The preferred and alternative embodiments of the present invention are described in detail below with reference to the following drawings.

FIG. 1A is a cross section view of an exemplary morphing wing system of the present invention in a consolidated configuration;

FIG. 1B is a cross section view of an exemplary morphing airfoil system of the present invention in a separated configuration;

FIG. 3A is a front view of an aircraft with an exemplary morphing airfoil system with an endplate of the present invention in a consolidated configuration;

FIG. 3B is a front view of an aircraft with an exemplary morphing airfoil system with an endplate of the present invention in a separated configuration;

FIG. 5A is a perspective view of an exemplary aircraft of the present invention with an airfoil morphing system in a consolidated configuration; and FIG. 5B is a perspective view of an exemplary aircraft of the present invention with an airfoil morphing system in a separated configuration.

DETAILED DESCRIPTION OF THE INVENTION

Figure 2A:
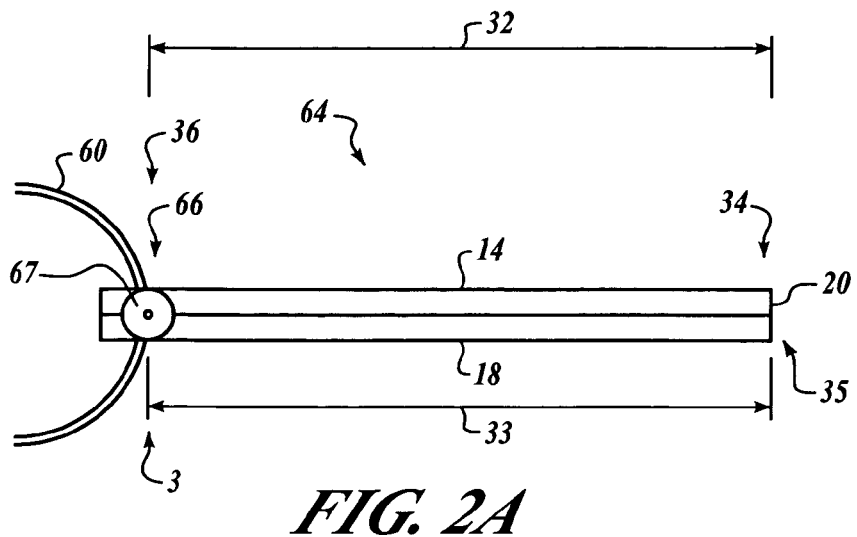
FIG. 2A is a front view of an aircraft with an exemplary morphing airfoil system of the present invention in a consolidated configuration.

The present invention provides a system for a morphing or changing aircraft airfoil. Given by way of overview, in one embodiment of the present invention, the morphing airfoil system includes a first airfoil having a first root, first span, first chord, and first tip. The first airfoil is attachable to an aircraft near the first root. The system includes a second airfoil having a second root, second span, second chord, and second tip. The second airfoil is attachable to the aircraft with the second root near the first root. At least one moveable connection is attached to at least one of the first airfoil and the second airfoil near their respective roots. The moveable connection is arranged to permit movement of at least one of the first airfoil and the second airfoil from a first position with their tips near each other to a second position with their tips spaced apart from each other. The tips suitably may be separated through movement with a component parallel to the airfoil chords and/or movement perpendicular to the airfoil chords. The system suitably may include an endplate, which may include a third airfoil, connecting the two airfoils linked to the two airfoils near their respective tips.

Referring to FIG. 1A, an exemplary morphing airfoil system 10 is shown in cross section. An upper airfoil 14 and a lower airfoil 18 are in a consolidated configuration. In the consolidated configuration, the two airfoils 14 and 18 are positioned near each other. By way of example and not limitation, the two airfoils 14 and 18 adjoin and touch each other across their chord from the leading edge 28 to the trailing edge 30 of the system 10. When the upper airfoil 14 and lower airfoil 18 are near each other they form a single combined airfoil with a separation surface 20 between them.

It will be appreciated that a variety of airfoil shapes may be utilized for the upper airfoil 14 and the lower airfoil 18. In the consolidated configuration, the upper airfoil 14 and the lower airfoil 18 suitably do not touch over all or part of their chords 26 when they are near each other, as shown in FIG. 1A. Additional devices, such as flexible or moveable leading edge or trailing edge covers or baffles (not shown) suitably may be utilized to decrease drag when the upper airfoil 14 and the lower airfoil 18 are near each other in the consolidated position.

FIG. 1B shows the morphing airfoil system 10 of FIG. 1A in a separated configuration. FIG. 1B is a cross section showing the upper airfoil 14 in the separated configuration spaced apart from the lower airfoil 18 by a separation distance 24 in a direction perpendicular to the chords 26 of the upper airfoil 14 and the lower airfoil 18. By way of example and not limitation, the system 10 also may suitably accommodate separation of the upper airfoil 14 away from the lower airfoil 18 with a component in a direction parallel to their respective chords 26. This is accommodated by moving either the upper airfoil 14 or the lower airfoil 18 forward or aft, or moving one forward and one aft, thereby resulting in a stagger of the upper airfoil 14 and lower airfoil 18 away from each other. In the exemplary embodiment shown in FIG. 1B, the upper airfoil 14 is staggered forward of the lower airfoil 18. This leaves the leading edge 28 of the upper airfoil 14 forward of the leading edge 28 of the lower airfoil 18 by a stagger distance 22.

Figure 2B:
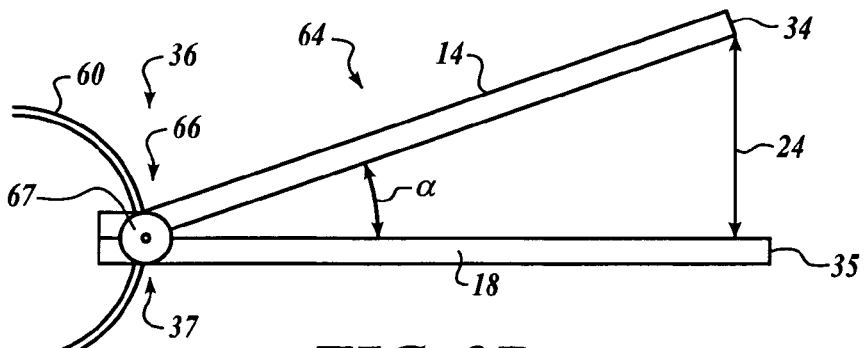
FIG. 2B is a forward view of an aircraft with an exemplary morphing airfoil system of the present invention in a separated configuration.

FIG. 2A shows an aircraft left wing 64 incorporating an exemplary embodiment of the present invention installed on an aircraft fuselage 60. In this view, from the forward end of the aircraft looking toward the wing 64, the upper airfoil 14 and the lower airfoil 18 are in a consolidated position near each other. In this exemplary embodiment, the upper airfoil 14 and the lower airfoil 18 are in contact with each other along their entire spans 32 and 33, respectively, from their roots 36 and 37, respectively, to their respective tips 34 and 35. The upper airfoil 14 and the lower airfoil 18 are in contact with each other along a separation surface 20 along the entire span of the wing 64. The upper airfoil 14 and the lower airfoil 18 are joined to the fuselage 60 at their respective roots 36 and 37. At the roots 36 and 37 is a morphing joint 66. By way of example, and not limitation, the morphing joint in the embodiment in FIG. 2A includes a hinge 67 that joins the fuselage 60 to the upper airfoil 14 and the lower airfoil 18. This permits the tips 34 and 35 of the upper airfoil 14 and lower airfoil 18 to be moved away from each other when the wing 64 is in a separated configuration as shown in FIG. 2B described below. In the consolidated configuration, in this example, both the roots 36 and 37 and the tips 34 and 35 of the two airfoils 14 and 18 are near each other.

FIG. 2B shows the wing 64 of FIG. 2A in the separated position with the upper airfoil 14 separated from the lower airfoil 18 at an angle α, with the vertex of the angle α at the roots 36 and 37. The upper airfoil 14 is joined to the aircraft fuselage 60 at the morphing joint 66. The lower airfoil 18 is also joined to the fuselage 60 at or near the morphing joint 66. The morphing joint 66 (in this embodiment, a hinge 67) permits the upper airfoil 14 to separate away from the lower airfoil 18 at their respective tips 34 and 35 while their respective roots 36 and 37 remain near each other where they are attached to the fuselage 60. Separating the upper airfoil 14 from the lower airfoil 18 by separating their tips 34 and 35 while keeping their roots 36 and 37 near each other results in the separation angle α between the airfoils 14 and 18. This produces a separation distance 24 between the tips 34 and 35. It will be appreciated that if an aircraft has two opposing wings, like the wing 64 in FIGS. 2A and 2B, the morphing wings form an "X" configuration when the upper airfoils 14 and lower airfoils 18 are in the separated position. The intersection of the "X" is at the fuselage 60 of the aircraft. It will be appreciated that the morphing wing 64 shown in FIG. 2A and 2B may also accommodate a swing or stagger by accommodating movement or swing (not shown) of the upper airfoil 14 or the lower airfoil 18 forward or aft, or both. This results in separating their tips 34 and 35 parallel with their chords (not shown). Such movement of the tips 34 and 35 parallel to the wing 10 chords (not shown) is not visible in the front views (FIGS. 2A and 2B).

It will be appreciated that the morphing joint 66 may be any suitable mechanical or material joint joining one or both of the upper airfoil 14 and lower airfoil 18 to the fuselage 60 that permits the tips 34 and 35 of the upper airfoil 14 and lower airfoil 18 to be alternately near each other and separated away from each other. By way of example, and not limitation, such a morphing joint 66 may advantageously be a hinge 67 attached to one of the upper airfoil 14 or the lower airfoil 18. Such a hinge suitably and relatively simply accommodates movement of the airfoil tips 34 and 35 towards each other and away from each other. Alternate morphing joints may include flexible materials, pivots, and hinges involving both airfoils 14 and 18. Typically the angle of separation α between the upper airfoil 14 and the lower airfoil 18 in a separated configuration with their tips 34 and 35 away from each other would be an acute angle.

Figure 2C:
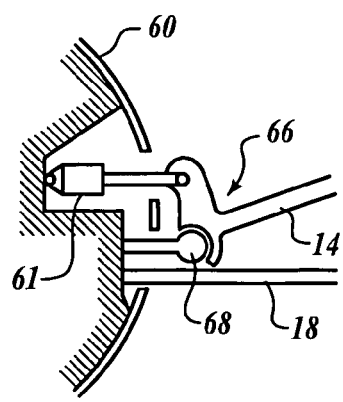
FIG. 2C is a cross-section of an aircraft with an exemplary morphing airfoil system of the present invention.

In an alternate embodiment, shown in FIG. 2C, the morphing joint of FIGS. 2A and 2B is a pivot 68 attached to the upper airfoil 14. The pivot 68 permits the upper airfoil 14 to pivot away from the lower airfoil 18. The upper airfoil 14, by way of example and not limitation, is driven towards and away from the lower airfoil 18 by a suitable drive mechanism 61, in this instance within the fuselage 60, linked to the upper airfoil 14 outboard of the pivot 68.

Wind tunnel testing indicates that in a separated configuration the lift produced by a morphing airfoil as shown in FIG. 2B may be increased by nearly 100%, and the stall angle of the aircraft may also increased by up to 50% when the airfoils 14 and 18 are in the separated position.

Typically a morphing airfoil system may be utilized to increase lift for takeoff and landing, hi-g maneuvers, and high altitude loitering. Such configurations provide increased lift and maneuverability. In other conditions, the morphing airfoil system may have the upper airfoil 14 and lower airfoil 18 consolidated for highspeed dashes or level flight at altitudes and payload configurations where extra lift of the separated morphing airfoil system may not be desired.

Turning to FIG. 3A, it will be appreciated that the morphing airfoil system as shown in FIGS. 2A and 2B may be suitably adapted to include an endplate 80 that joins an upper airfoil 72 to a lower airfoil 74 near the upper airfoil tip 78 and the lower airfoil tip 82. In FIG. 3A, a morphing wing 70 is attached to an aircraft fuselage 60. FIG. 3A is a front view of the wing 70, which includes an upper airfoil 72 and a lower airfoil 74 in their consolidated configuration. The upper airfoil 72 and the lower airfoil 74 touch along their spans 32 and 33 respectively along a separation surface 20, when the upper airfoil 72 is near the lower airfoil 74. In this example embodiment, the upper airfoil 72 is joined at its root 36 to the fuselage 60 at or near a morphing joint 76. The lower airfoil 74 is also joined to the fuselage 60 at or near its root 37 at or near the morphing joint 76. The morphing joint 76, as in the system described in connection with FIGS. 2A and 2B, suitably allows the upper airfoil 72 and the lower airfoil 74 to separate from each other at their tips 78 and 82 respectively. This occurs while their roots 36 and 37 remain near each other where the upper airfoil 72 and lower airfoil 74 are attached to the fuselage 60. In FIG. 3A the upper airfoil 72 has a tip 78 which is linked through a morphing joint 79 to a first end 85 of an endplate 80. At an opposite end 87 of the endplate 80, the endplate 80 is joined to the lower airfoil tip 82 at a tip morphing joint 83 near the tip 71 of the wing 70. In the consolidated position, the endplate 80, upper airfoil 72, and lower airfoil 74 all form a single airfoil touching each other along the surface 20 along the span 73 of the wing 70. In this exemplary wing 70, by way of example but not limitation, the upper airfoil 72 has a span 32 approximately ⅔ the span 33 of the lower airfoil 74. The span 89 of endplate 80 is approximately ⅓ the span 33 of the lower airfoil 74. The upper airfoil 72 joined end to end with the endplate 80 form a combined span of the same span 33 as the lower airfoil 74. Thus, when the wing 70 is in the consolidated configuration, the upper airfoil 72 and the endplate 80, combined end to end, rest against the lower airfoil 74 over the entire span 73 of the wing 70. This suitably forms a single combined airfoil. The system 70 also includes a morph joint 76 at the roots 36 and 37, respectively of the upper airfoil 72 and lower airfoil 74.

FIG. 3B shows the morphing wing 70 of FIG. 3A in a separated configuration, with the upper airfoil 72 and the lower airfoil 74 away from each other at their respective tips 78 and 82. The upper airfoil 72 and lower airfoil 74 are also near each other at their respective roots 36 and 37 where they are joined near the root morph joint 76 to the fuselage 60. The upper airfoil 72 and the lower airfoil 74 form an angle β with a vertex at or near their roots 36 and 37 at or near the morphing joint 76. The endplate 80 joins the tip 82 of the lower airfoil 74 to the tip 78 of the upper airfoil 72. The first end 85 of the endplate 80 is joined to the upper airfoil 72 near the tip 78 of the upper airfoil 72, at an upper endplate morph joint 79. The opposite end 87 of endplate 80 is joined to the tip 82 of the lower airfoil 74 at a lower endplate morph joint 83. A combination of movement at the morph joint 76 at the fuselage 60, the upper endplate morph joint 79, and lower endplate morph joint 83 accommodate the motion of the upper airfoil 72 and the lower airfoil 74 away from each other at their respective tips 82 and 78 while still permitting the tips 82 and 78 to be joined to the endplate 80. The endplate 80 suitably structurally joins the upper airfoil 72 to the lower airfoil 74, thereby increasing the strength of the wing 70. The wing 70 (along with the two airfoils 72 and 74 joined by the endplate 80) also has the benefit of a "endplate" effect. This is aerodynamic benefit of having the airfoil tips 72 and 74 attached to a deflecting surface, as is sometimes obtained in aircraft using wingtip winglets. The endplate 80 itself typically may have an airfoil shape. In this embodiment, the endplate 80 joining the tips 78 and 82 of the upper airfoil 72 and the lower airfoil 74, respectively, suitably provides an aerodynamic endplate effect to the wing 70. It will be appreciated that the morphing joints 76, 79 and 83 and one or more of the upper airfoil 72, lower airfoil 74, and endplate 80 may change length to permit the upper airfoil 72 to rotate away from the lower airfoil 74 when the wing 70 is in the separated configuration. In this example embodiment, the upper airfoil 72 separates from the lower airfoil 74 at a constant angle β with an increasing distance between the two airfoils as one proceeds further away from the roots 36 and 37. In the separated configuration, the upper airfoil 72, endplate 80 and lower airfoil 74 form a triangular shaped wing 70 with the endplate 80 linking the two tips 82 and 78 of the upper airfoil 72 and the lower airfoil 74.

It will be appreciated that the respective lengths of the upper airfoil 72, lower airfoil 74, and endplate 80 may be variable so that the airfoils 72 and 74, and endplate 80 suitably may rest against each other in a consolidated configuration, and separate from each other forming a triangle in the separated configuration. It will also be appreciated that with advanced materials part or all of the components, upper airfoil 72, endplate 80, and lower airfoil 74, and their accompanying morph joints 76, 79 and 83 may be flexible and not rigidly linear components. As described in connection with FIGS. 2A and 3B, the morph joint suitably may include hinges, pivots, or flexible materials.

It will be appreciated that the morphing wings of the present invention may be moved between their consolidated positions and their separated positions by a variety of mechanisms. Electrical or hydraulic drives (not shown) may move the airfoils between their consolidated and separated positions. Further, one or more aerodynamic control surfaces (not shown) on the airfoils themselves advantageously may fly the airfoils together and apart, from their consolidated position to their separated position, and back, with or without further power mechanisms.

Figure 4B:
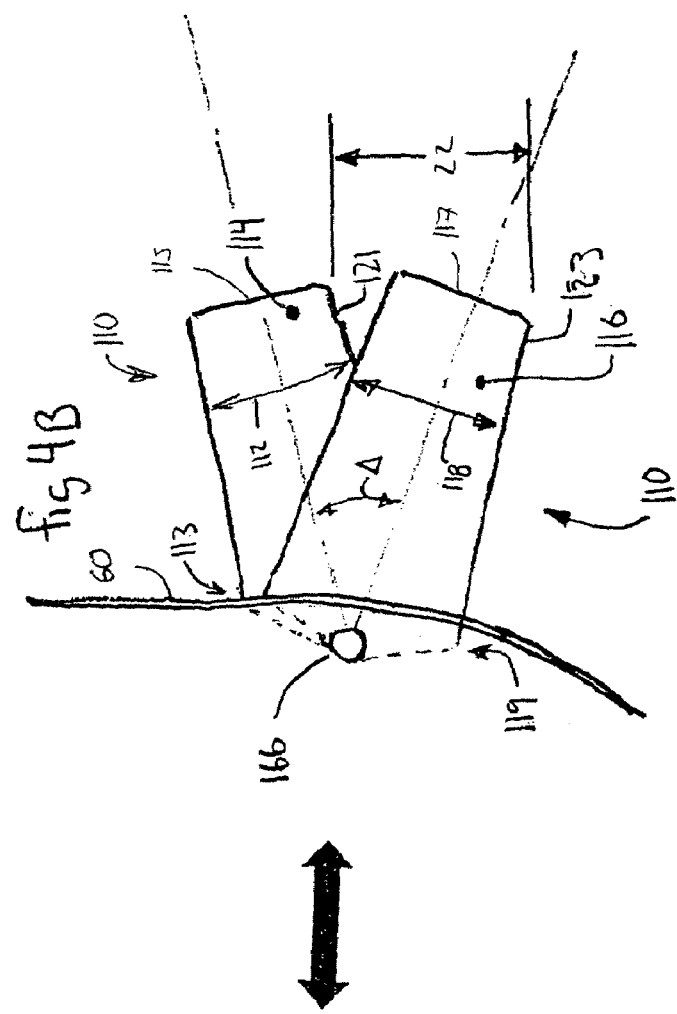
FIG. 4B is a top view of an aircraft with an exemplary airfoil morphing system of the present invention with the airfoils in a separated configuration.
Figure 4A:
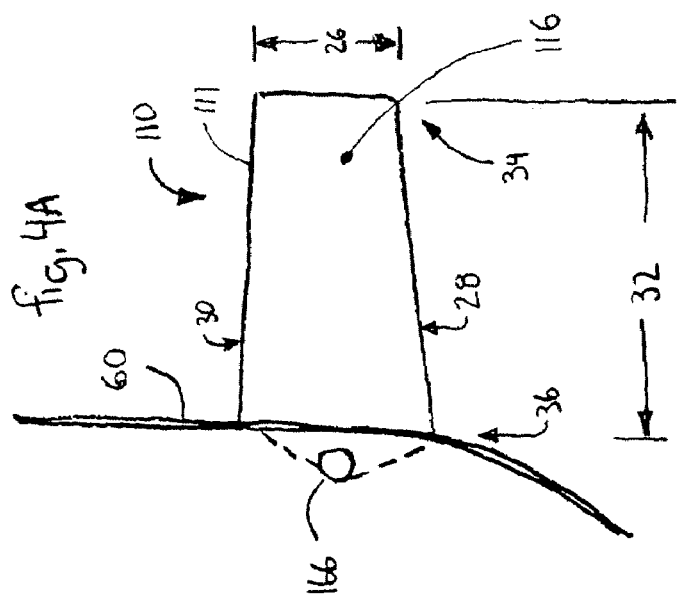
FIG. 4A is top view of an aircraft with a exemplary morphing airfoil system of the present invention in a consolidated configuration.

FIG. 4A is a top view of an exemplary morphing wing 110 attached to a fuselage 60. The wing 110 is in a consolidated position, thereby forming a single airfoil 111. By way of example and not limitation, the airfoil 111 is linked to the fuselage 60 at a morph joint 166. In this embodiment, by way of example and not limitation, the morph joint 166 is at least in part a pivot. This allows components of the airfoil 111 of the wing to pivot forward as shown in FIG. 4B, described below. In the consolidated position, as shown in FIG. 4A, the wing 110 forms a single airfoil 111 with a single tip 34, a leading edge 28, a trailing edge 30 and a root 36 connected to the morphing joint 166 at the fuselage 60. In this embodiment, the upper airfoil 116 and lower airfoils (not visible in this view, being covered by the upper airfoil 116) of the wing 110 are suitably situated with their spans 32 parallel and overlapping with each other, with the upper airfoil 116 above the lower airfoil (not shown), thereby forming the single airfoil 111.

In FIG. 4B the exemplary wing 110 of FIG. 4a is shown in a separated position with the upper airfoil 116 and lower airfoil 114 swung or swept away from each other at an angle Δ with a vertex at the morph joint 166. In this example, the tip 117 of the upper airfoil 116 has swung forward while the upper airfoil 116 root 119 remains in a relatively fixed position pivoting at the morph joint 166 within the fuselage 60. The tip 115 of the lower airfoil 114 has swept aft while the lower airfoil 114 root 113 remains relatively fixed, pivoting at the morph joint 166 within the fuselage 60. In this embodiment the tips 117 and 115, respectively, of the upper airfoil 116 and the lower airfoil 114 separate or scissor open with a component parallel to their chords 112 and 118, respectively, while their roots 113 and 119 remain near each other.

It will be appreciated that an aircraft with two opposite wings (not shown) incorporating the wing 110 of FIG. 4B, in the separated configuration would show an "X" shape when viewed from above, with their respective tips right and left separated and their central roots joined at the intersection of the "X" at the fuselage 60. The morphing of the wing 110 swinging the upper airfoil 116 forward and the lower airfoil 114 aft results in a separation distance or stagger 22, between the forward leading edges 123 and 121, respectively, of the upper airfoil 116 and lower airfoil 114.

By way of example and not limitation, a morphing joint 166 permitting one or both of the upper airfoil 116 and lower airfoil 114 to swing or sweep forward or aft may suitably include a pivot. It will be appreciated that sweeping of the upper airfoil 116 and lower airfoil 114 with a component parallel to their chords 118 and 112 may be combined with a roll component (not shown) moving the tips 117 and 115 away from each other with a component perpendicular to their chords 118 and 112 in the manner described in connection with FIGS. 2A, 2B, 3A and 3B. Such a configuration would include separation of the tips 117 and 115 of the upper airfoil 116 and lower airfoil 114 forward and aft and vertically with respect to the fuselage 60. At their roots 113 and 119, the upper airfoil 116 and lower airfoil 114 would remain near each other within the fuselage 60.

FIG. 5A shows an aircraft 280 with morphing wings 284 according to an embodiment of the present invention. The aircraft 280 includes a fuselage 60 and an engine 62. In FIG. 5A the wings 284 are shown in a consolidated configuration, so the component airfoils for each of the two wings 292 and 294 are not visible. The wings 292 and 294 are joined to the fuselage 60 with morph joints 290 at their roots 236. In the consolidated configuration shown in FIG. 5A, the aircraft has two wings, one each on opposite sides of the fuselage 60 with each wing 292 and 294 composed of a single combined airfoil, from their roots 236 to their tips 234 airfoil.

FIG. 5B shows the aircraft of FIG. 5A with the wings 284 in a separated configuration. The aircraft 280 includes a fuselage 60 and an engine 62. In the separated configuration, the wings 292 and 294 are each separated into upper airfoils 286 and lower airfoils 288. The airfoils 286 and 288 are separated from each other at their tips 234 by a separation distance 224 which has a component perpendicular to the wing chord, and a component parallel to the wing span. In other words, the tips 234 of each airfoil are separated from their counterpart tip by a sweep or stagger (yaw rotation with respect to the fuselage 60), as well as vertically (roll rotation with respect to the fuselage 60). In the separated configuration, the aircraft 280 has four airfoils, because each wing 292 and 294 on each side of the fuselage 60 of the aircraft 280 is separated into upper 286 and lower 288 airfoils. It will be appreciated that the aircraft 280 of FIG. 5B when viewed from the front will show an "X" shaped airfoil configuration with the tips 234 of the right and left wings 292 and 294 separated at their tips and joined at their roots 236. In this example the upper and lower airfoils 286 and 288 of each wing 292 and 294 are joined to the fuselage 60 by a morphing joint 290. It will also be appreciated that the aircraft 280 of FIG. 5B when viewed from the side in the separated configuration will show the wing tips 234 on each side separated vertically from each other, with one slightly forward of the other. In the separated configuration as in FIG. 5B, the aircraft 280 gains increased maneuverability and lift. In the consolidated configuration as in FIG. 5A, the aircraft 280 suitably attains greater speed with less drag where dash capabilities are desired. Separation angles between the upper and lower airfoils 286 and 288 include angles between around 15 degrees and around 37.5 degrees. At these angles, the separated wings 292 and 294 provide more lift for comparable of drag as compared to the wings 292 and 294 in the consolidated configuration.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A morphing airfoil system for an aircraft, the system comprising:

a first non-planar airfoil having a first root, a first span, a first chord, and a first tip, the first airfoil being attachable to an aircraft near the first root;

a second non-planar airfoil having a second root, a second span, a second chord, and a second tip, the second airfoil being attachable to the aircraft near the first root; and at least one movable connection attached to at least one of the first airfoil near the first root and the second airfoil near the second root, the movable connection being arranged to move at least one of the first airfoil and the second airfoil from a first position with the first tip and second tip near each other during a flight condition other than takeoff and landing to a second position with the first tip and second tip spaced apart from each other, during at least one of takeoff and landing.

2. The system of claim 1, wherein the movable connection includes a hinge.

3. The system of claim 1, wherein the movable connection includes a pivot.

4. The system of claim 1, wherein the movable connection includes a drive mechanism arranged to move at least one of the first airfoil and the second airfoil between the first position and the second position.

5. The system of claim 1, wherein the movable connection is further arranged to move at least one of the first airfoil and the second airfoil in a first direction approximately perpendicular to at least one of the first chord and the second chord.

6. The system of claim 1, wherein the first span is substantially parallel to the second span in the first position.

7. The system of claim 1, wherein the first span is at an acute angle to the second span in the second position.

8. The system of claim 1, wherein the first airfoil and the second airfoil form a single non-planar airfoil in the first position.

9. An aircraft with a morphing airfoil, the aircraft comprising:

a fuselage;

at least one engine;

a first non-planar airfoil having a first root, a first span, a first chord, and a first tip, the first airfoil being attached to the fuselage near the first root;

a second non-planar airfoil having a second root, a second span, a second chord, and a second tip, the second airfoil being attached to the fuselage near the first root; and at least one movable connection attached to the fuselage and attached to at least one of the first airfoil near first root and the second airfoil near second root, the movable connection being arranged to move at least one of the first airfoil and the second airfoil from a first position with the first span substantially parallel to the second span during a flight condition other than takeoff and landing to a second position with the first span at an acute angle to the second span, during at least one of takeoff and landing.

10. The aircraft of claim 9, wherein the movable connection includes a hinge.

11. The aircraft of claim 9, wherein the movable connection includes a pivot.

12. The aircraft of claim 9, wherein the movable connection includes a drive mechanism arranged to move at least one of the first airfoil and the second airfoil between the first position and the second position.

13. The aircraft of claim 9, wherein the movable connection is arranged to move at least one of the first airfoil and the second airfoil in a first direction approximately perpendicular to at least one of the first chord and the second chord.

14. The aircraft of claim 9, wherein the first span is substantially parallel to the second span in the first position.

15. The aircraft of claim 9, wherein the first span is at an acute angle to the second span in the second position.

16. The aircraft of claim 9, wherein the aircraft includes an unmanned air vehicle.

17. An aircraft with a morphing airfoil system, the comprising:
   a fuselage;
   at least one engine;
   a first airfoil having a first root, a first span, a first chord, and a first tip, the first airfoil being attachable to an aircraft near the first root;
   a second airfoil having a second root, a second span, a second chord, and a second tip, the second airfoil being attachable to the aircraft near the first root;
   an endplate having a first end, a second end, and a third span between the first end and second end, the endplate being attached to the first airfoil with the first end near the first tip and being attached to the second airfoil with the second end near the second tip; and
   at least one movable connection attached to at least one of the first airfoil near the first root and the second airfoil near the and the second root, the movable connection being arranged to move at least one of the first airfoil and the second airfoil from a first position with the first span substantially parallel to the second span to a second position with the first span at an acute angle to the second span.

18. A morphing rotating airfoil system for an aircraft, the system comprising:
   a hub;
   a first non-planar airfoil having a first root, a first span, a first chord, and a first tip, the first airfoil being attached to the hub near the first root;
   a second non-planar airfoil having a second root, a second span, a second chord, and a second tip, the second airfoil attached to the hub near the first root;
   at least one movable connection attached to the hub, the movable connection being attached to at least one of the first airfoil near the first root and the second airfoil near the second root, the movable connection being arranged to move at least one of the first airfoil and the second airfoil from a first position during a flight condition other than takeoff and landing with the first tip and second tip near each other to a second position wherein the first airfoil and the second airfoil form a double airfoil configured for increased lift during at least one of takeoff and landing with the first tip and second tip spaced apart from each other.

19. The system of claim 18, wherein the movable connection includes a hinge.

20. The system of claim 18, wherein the movable connection includes a pivot.

21. The system of claim 18, wherein the movable connection includes a drive mechanism arranged to move at least one of the first airfoil and the second airfoil between the first position and the second position.

22. The system of claim 18, wherein the movable connection is arranged to move at least one of the first airfoil and the second airfoil in a first direction approximately perpendicular to at least one of the first chord and the second chord.

23. The system of claim 18, wherein the first span is substantially parallel to the second span in the first position.

24. The system of claim 18, wherein the first span is at an acute angle to the second span in the second position.

25. The system of claim 18, wherein the first airfoil and the second airfoil form a combined airfoil configured for reduced drag during high speed flight in the first position.

26. The system of claim 18, wherein the hub is attached to a fuselage of an aircraft.

27. The system of claim 18, wherein the aircraft includes an unmanned air vehicle.

* * * * *